United States Patent
Sawyer

(10) Patent No.: US 10,377,347 B2
(45) Date of Patent: Aug. 13, 2019

(54) LOW-PROFILE VENTILATION SYSTEM FOR A MOTOR VEHICLE AND RELATED METHOD OF PROVIDING A LOW-PROFILE VENTILATION SYSTEM

(71) Applicant: FORD GLOBAL TECHNOLOGIES, LLC, Dearborn, MI (US)

(72) Inventor: Robert Steven Sawyer, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 14/641,655

(22) Filed: Mar. 9, 2015

(65) Prior Publication Data

US 2016/0264099 A1 Sep. 15, 2016

(51) Int. Cl.
| | |
|---|---|
| *B60S 1/02* | (2006.01) |
| *B60H 1/34* | (2006.01) |
| *B60S 1/54* | (2006.01) |
| *B60H 1/00* | (2006.01) |

(52) U.S. Cl.
CPC .......... *B60S 1/023* (2013.01); *B60H 1/00028* (2013.01); *B60H 1/00564* (2013.01); *B60H 1/34* (2013.01); *B60S 1/544* (2013.01); *B60H 2001/00085* (2013.01); *B60H 2001/00214* (2013.01)

(58) Field of Classification Search
CPC .. B60H 1/24; B60H 1/00028; B60H 1/00564; B60H 1/34; B60G 1/24; B60G 1/0028; B60G 1/34; B60G 1/00564; B60S 1/023
See application file for complete search history.

(56) References Cited

U.S. PATENT DOCUMENTS

| | | | | |
|---|---|---|---|---|
| 5,217,405 A | * | 6/1993 | Tanaka | B60H 1/00028 454/121 |
| 5,433,772 A | * | 7/1995 | Sikora | B03C 3/32 422/120 |
| 5,645,479 A | * | 7/1997 | Komowski | B60H 1/00514 454/139 |

(Continued)

FOREIGN PATENT DOCUMENTS

| | | |
|---|---|---|
| EP | 1826040 A1 | 8/2007 |
| EP | 2316676 A2 | 5/2011 |

OTHER PUBLICATIONS

English translation of EP2316676A2.
English translation of EP1826040A1.

*Primary Examiner* — Gregory L Huson
*Assistant Examiner* — Phillip Decker
(74) *Attorney, Agent, or Firm* — Vichit Chea; King & Schickli, PLLC

(57) ABSTRACT

A low-profile ventilation system is provided for a motor vehicle. That low-profile ventilation system includes an inlet duct having an inlet-free top wall, a sidewall and a bottom wall. A recirculating air inlet is provided in the sidewall. A fresh air inlet is also provided in the sidewall. A related method of providing a low-profile ventilation system is also provided. The method includes providing an inlet duct with an inlet-free top wall and both a fresh air inlet and a recirculating air inlet, wherein the recirculating air inlet has first and second laterally opposing openings in a sidewall of the inlet duct.

3 Claims, 3 Drawing Sheets

(56) References Cited

U.S. PATENT DOCUMENTS

| | | | | |
|---|---|---|---|---|
| 5,673,964 A * | 10/1997 | Roan | | B60H 1/00028 296/208 |
| 5,699,960 A * | 12/1997 | Kato | | B60H 1/0065 237/12.3 A |
| 5,810,896 A * | 9/1998 | Clemens | | B01D 46/0023 55/385.3 |
| 5,879,230 A * | 3/1999 | Wardlaw | | B60H 1/00685 454/139 |
| 6,450,877 B2 * | 9/2002 | Tsurushima | | B60H 1/00692 454/121 |
| 6,579,167 B1 * | 6/2003 | Demeniuk | | B60H 1/00671 165/41 |
| 6,669,550 B1 * | 12/2003 | Urbank | | B60H 1/00785 454/121 |
| 6,958,009 B2 * | 10/2005 | Shindou | | B60H 1/00028 454/121 |
| 7,357,176 B2 * | 4/2008 | Yelles | | B60H 1/00849 165/202 |
| 8,002,615 B2 * | 8/2011 | Jeong | | B60H 1/00849 454/139 |
| 8,602,853 B2 * | 12/2013 | Kim | | B60H 1/00028 454/139 |
| 8,944,144 B2 * | 2/2015 | Elliot | | B60H 1/00542 165/202 |
| 9,676,245 B2 * | 6/2017 | Clemence | | B60H 1/00021 |
| 2002/0025772 A1 * | 2/2002 | Egami | | B60H 1/00849 454/121 |
| 2007/0218824 A1 * | 9/2007 | Bailey | | B60H 1/00849 454/139 |
| 2010/0144261 A1 * | 6/2010 | Barkic | | B60H 1/00457 454/75 |
| 2010/0237649 A1 * | 9/2010 | Concina | | B60H 1/248 296/70 |
| 2011/0036117 A1 * | 2/2011 | Frohling | | B60H 1/00028 62/507 |
| 2011/0165830 A1 * | 7/2011 | Smith | | B60H 1/00278 454/75 |
| 2011/0278874 A1 * | 11/2011 | Lucas | | B60H 1/00278 296/37.1 |
| 2012/0009859 A1 * | 1/2012 | Wijaya | | B60H 1/00764 454/75 |
| 2012/0247744 A1 * | 10/2012 | Maehata | | B60H 1/00828 165/200 |
| 2014/0065943 A1 * | 3/2014 | Clemence | | B60H 1/00021 454/265 |
| 2014/0234092 A1 * | 8/2014 | Maranville | | F04D 17/162 415/185 |

* cited by examiner

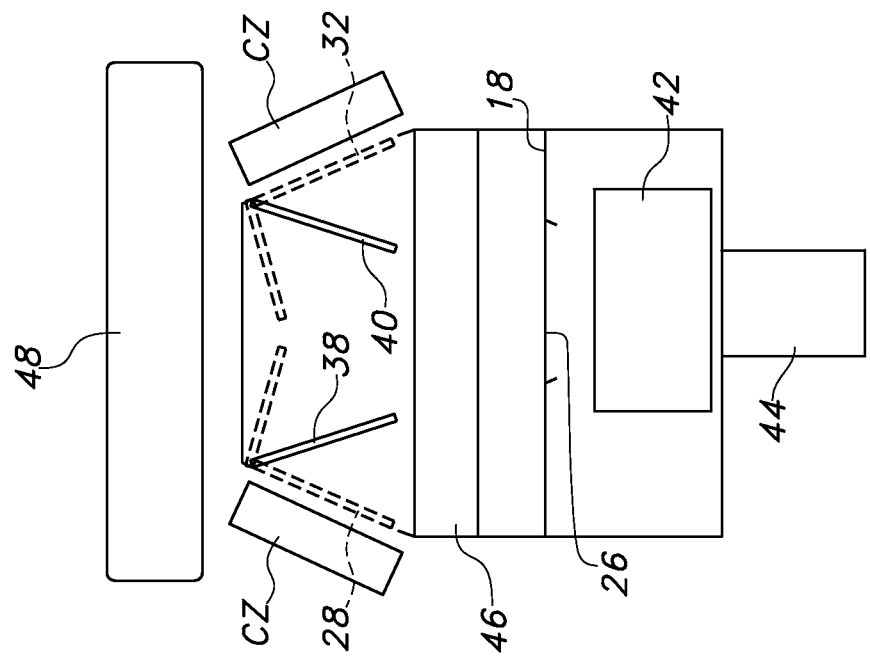
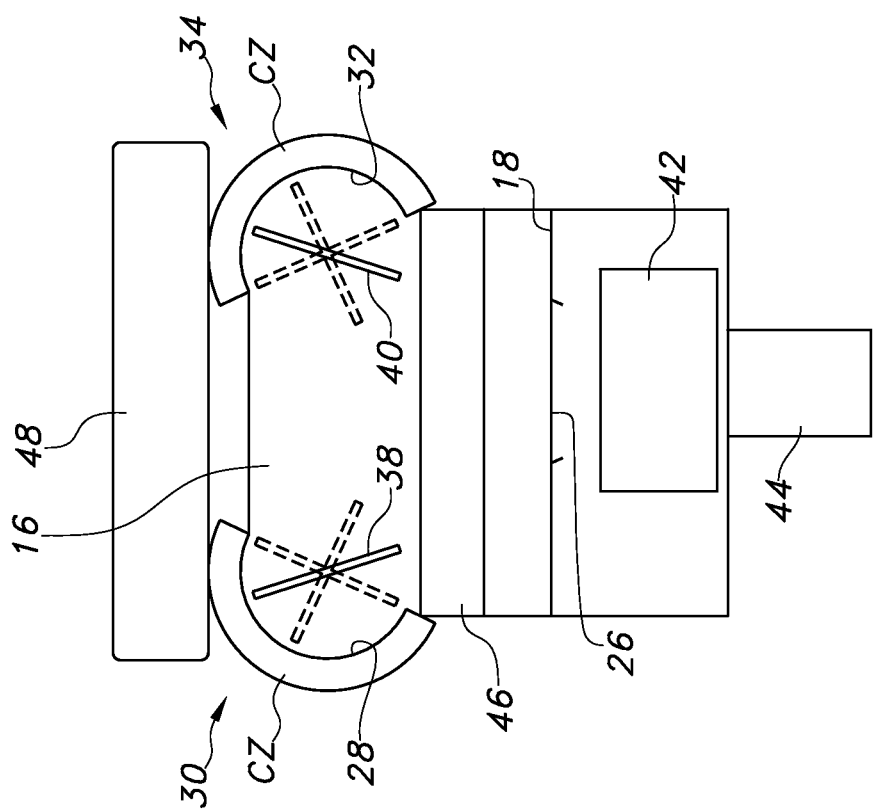

LOW-PROFILE VENTILATION SYSTEM FOR A MOTOR VEHICLE AND RELATED METHOD OF PROVIDING A LOW-PROFILE VENTILATION SYSTEM

TECHNICAL FIELD

This document relates generally to the motor vehicle field and, more particularly, to a low-profile ventilation system for a motor vehicle that is more compact, improves air flow and reduces noise.

BACKGROUND

A finite amount space is available in a vehicle passenger compartment between the vehicle instrument panel top surface IP and the top of the foot zone FZ in front of a passenger P. As illustrated in FIG. 1, in a prior art ventilation system, the inlet duct ID includes a recirculating air inlet RI and cooperating recirculating inlet doors RD in a top wall TW of the inlet duct, a fresh air inlet FI and cooperating fresh inlet air door FD in a front wall of the inlet duct and an air filter AF. In addition, a blower inlet BI is provided in the bottom wall of the inlet duct ID or top of the scroll fan SF that is driven by the drive motor (not shown).

As further illustrated in FIG. 1, in the prior art design, the panel duct PD, the defroster duct D and the demister duct DD must all be packaged in the relatively confined space provided between the top wall TW of the inlet duct ID and the top surface of the instrument panel IP. As should be further appreciated, a recirculating air clearance zone CZ must also be provided between the panel, defroster and demister ducts PD, D, DD and the recirculating air inlet RI in the top wall TW of the inlet duct ID. Failure to maintain the necessary recirculating clearance zone CZ may compromise airflow into the recirculating air inlet RI. Further, air that is drawn into the recirculating inlet RI that is also forced to pass over and around the panel, defroster and demister ducts PD, D, DD in a circuitous route may generate undesired noise. As a result of the relatively cramped area between the top wall TW of the inlet duct ID and the top surface of the instrument panel IP, it may not always be possible to design the panel duct PD, defroster duct D, and/or demister duct DD to optimum route or size specifications as airflow through the clearance zone CZ into the recirculating inlet RI may become degraded. Consequently, state-of-the-art ventilation systems with a recirculating inlet RI in the top wall TW of the inlet duct ID often represent a series of compromises that generate unwanted noise and/or result in some performance inefficiency.

This document relates to a new and improved ventilation system of lower profile that is able to better accommodate the panel duct PD, defroster duct D and demister duct DD while maintaining free and unrestricted airflow to the recirculating air inlet RI in the inlet duct ID.

SUMMARY

In accordance with the purposes and benefits described herein, a low-profile ventilation system is provided for a motor vehicle. That system may be broadly described as comprising an inlet duct having an inlet-free top wall, a sidewall and a bottom wall. A recirculating air inlet is provided in the side wall. A fresh air inlet is also provided in the side wall. The ventilation system also includes a blower inlet. In addition, a panel duct, a defroster duct and a demister duct are all provided overlying the inlet-free top wall.

The system further includes a scroll fan and a drive motor underlying the blower inlet in the bottom wall. Further, an air filter is provided in the inlet duct overlying the blower inlet.

In one possible embodiment, the fresh air inlet is provided in a first section of the sidewall. Further, a fresh air inlet door is provided for opening and closing the fresh air inlet.

In one possible embodiment, the recirculating air inlet is a first opening provided in a second section of the sidewall. Further, the recirculating air inlet may include a second opening provided in a third section of the sidewall. In such an embodiment, the second section is opposite the third section and the first section is substantially perpendicular to the second and third sections. Such an embodiment further includes a first recirculating air door for opening and closing the first opening and a second recirculating air door for opening and closing the second opening.

In one possible embodiment, the second section of the sidewall is convex in profile. In that embodiment, the third section of the sidewall may also be convex in profile. In any of the embodiments, the fresh air inlet has a minimum surface area of 161.29 cm². Further, the first opening and the second opening may each have a minimum surface area of 82 cm².

In accordance with an additional aspect, a method of providing a low-profile ventilation system is provided. That method may be broadly described as comprising the step of providing an inlet duct with an inlet-free top wall and both a fresh air inlet and a recirculating air inlet in a sidewall of the inlet duct. Further, that method may be described as including the step of providing a blower inlet in a bottom wall of the inlet duct. Still further, the method may include positioning at least one of a panel duct, a defroster duct and a demister duct immediately adjacent to or against the inlet-free top wall.

In the following description, there are shown and described several preferred embodiments of the low-profile ventilation system. As it should be realized, the ventilation system is capable of other, different embodiments and its several details are capable of modification in various, obvious aspects all without departing from the ventilation system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the low-profile ventilation system and together with the description serve to explain certain principles thereof. In the drawing figures:

FIGS. 3a and 3b are rear schematic views of two possible alternative embodiments of the low-profile ventilation system as illustrated in FIG. 2.

Reference will now be made in detail to the present preferred embodiments of the low-profile ventilation system, examples of which are illustrated in the accompanying drawing figures.

DETAILED DESCRIPTION

Figure 2:
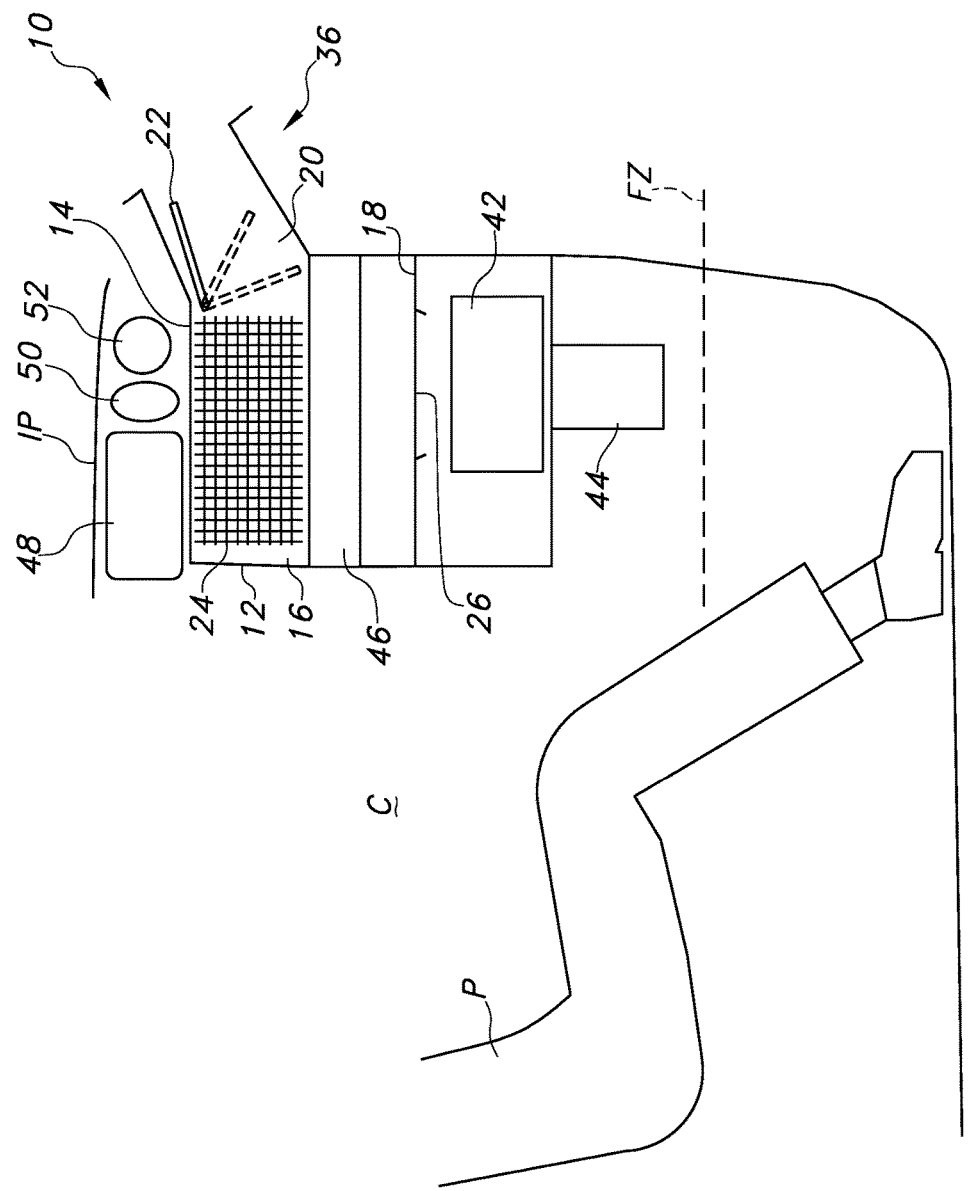
FIG. 2 is a schematic right side view of the low-profile ventilation system that is the subject matter of this document.

Reference is now made to FIG. 2 illustrating the low-profile ventilation system 10 for circulating fresh air and recirculating interior cabin air through the motor vehicle cabin C. As illustrated in FIG. 2, the low-profile ventilation system 10 fits easily within the confines between the foot zone FZ and the top surface of the instrument panel IP in front of the vehicle occupant P. As illustrated, the low-profile ventilation system 10 includes an inlet duct 12 having an inlet-free top wall 14, a sidewall 16 and a bottom wall 18. A fresh air inlet 20 is provided in a first or front section of the sidewall 16. A fresh air inlet door 22 is provided for opening and closing the fresh air inlet 20.

The ventilation system 10 also includes a recirculating air inlet 24 in the sidewall 16 and a blower inlet 26. That blower inlet 26 may be provided in the bottom wall 18 of the inlet duct 12 or in the top of the scroll fan 42. As further illustrated in FIG. 3a, the recirculating air inlet 24 may comprise a first opening 28 in a second section 30 of the sidewall 16 and a second opening 32 in a third section 34 of the sidewall opposite the second section. As should be appreciated from viewing FIGS. 2 and 3a together, the first section 36 of the sidewall 16 including the fresh air inlet 20 is substantially perpendicular to the second and third sections 30, 34 including the first and second openings 28, 32 of the recirculating air inlet 24.

As further illustrated in FIG. 3a, a first recirculating air door 38 is provided for opening and closing the first opening 28 while a second recirculating air door 40 is provided for opening and closing the second opening 32. Thus, it should be appreciated that the fresh air inlet 20 and the first and second openings 28, 32 of the recirculating air inlet 24 are all provided in the sidewall 16 between the inlet-free top wall 14 and the bottom wall 18 including the blower inlet 26.

In the embodiment illustrated in FIG. 3a, the first and second openings 28, 32 of the recirculating air inlet 24 are convex in profile and provide two arcuate or convex clearance zones CZ for the flow of air into the openings. In contrast, in the embodiment of the low-profile ventilation system 10 illustrated in FIG. 3b, the first and second openings 28, 32 are inclined and straight in profile and provide two rectangular clearance zones CZ for the flow of air into the openings. In any of the embodiments, the fresh air inlet 20 and the recirculating air inlet 24 must both provide sufficient airflow for the proper and efficient operation of the ventilation system 10. Thus, in one particularly useful embodiment, the fresh air inlet 20 has a minimum surface area of 161.29 $cm^2$. The first opening 28 also has a minimum surface area of 82 $cm^2$. Further, the second opening 32 has a minimum surface area of 82 $cm^2$.

As further illustrated in FIGS. 2, 3a and 3b, in any of the embodiments, the low-profile ventilation system 10 also includes the scroll fan 42 underlying the inlet duct 12. A drive motor 44 is provided to drive the scroll fan 42 so as to draw air from the inlet duct 12 through the cabin air filter 46 overlying the blower inlet 26 and then force that air through the remaining components of the vehicle air conditioning system (not shown) such as an evaporator for cooling and dehumidifying that air and/or a heater core for heating that air before it is delivered through, for example, a panel duct 48, a defroster duct 50 and a demister duct 52 into the vehicle cabin C.

As best illustrated in FIG. 2, the panel duct 48, the defroster duct 50 and the demister duct 52 are all provided in the relatively confined space between the inlet-free top wall 14 of the inlet duct 12 and the top surface of the instrument panel IP. In one particularly useful embodiment, the panel duct 48, the defroster duct 50 and/or demister duct 52 is provided immediately adjacent to or even against that top wall 14.

Figure 1:
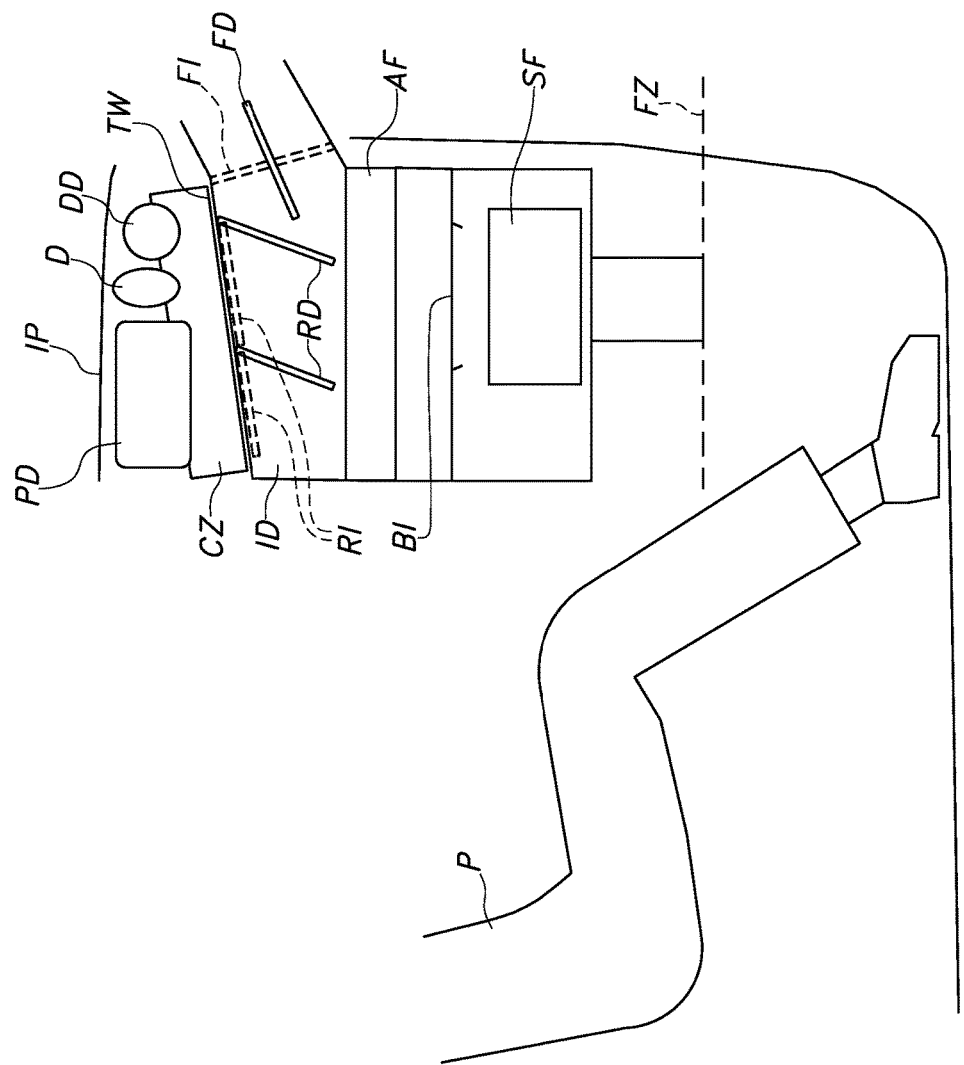
FIG. 1 is a schematic side view illustrating a prior art ventilation system incorporating a recirculating air inlet in the top wall of the inlet duct.

As should be appreciated, since the fresh air inlet 20 and the first and second openings 28, 32 of the recirculating air inlet 24 are all provided in sections 32, 34, 36 of the inlet duct sidewall 16, the inlet duct top wall 14 remains inlet free. This is in stark contrast to the inlet duct structure of the prior art illustrated in FIG. 1 wherein the recirculating air inlet RI is provided in the top wall TW. In the prior art design illustrated in FIG. 1, it is necessary to maintain a clearance zone CZ to allow for the free passage of recirculating air from the cabin C into the recirculating air inlet RI in the relatively confined area between the top wall TW of the inlet duct ID and the top surface of the instrument panel IP. This makes it extremely difficult to provide the panel duct PD, the defroster duct D and the demister duct DD in that same confined area without compromises to airflow through those ducts or the flow of recirculating air into the recirculating inlet RI.

In contrast, in the low-profile ventilation system 10 illustrated in FIGS. 2, 3a and 3b, the first and second openings 28, 32 of the recirculating air inlet 24 are provided in the opposed sections 32, 34 of the sidewall 16 and the entire area between the inlet-free top wall 14 and the top surface of instrument panel IP is reserved to accommodate the panel duct 48, the defroster duct 50 and the demister duct 52. As a result, design compromises are unnecessary and the recirculating air inlet 24, panel duct 48, the defroster duct 50 and the demister duct 52 are all easily accommodated without any compromise to the operating efficiency of the ventilation system.

Consistent with this disclosure, a method of providing a low-profile ventilation system is also disclosed. That method may be broadly described as providing an inlet duct 12 with an inlet-free top wall 14 and both a fresh air inlet 20 and a recirculating air inlet 24 in a sidewall 16 of the inlet duct.

In addition, that method may be further described as including the step of providing a blower inlet 26 in a bottom wall 18 of the inlet duct 12. Further, the method may also include the step of positioning at least one of a panel duct 48, a defroster duct 50 and a demister duct 52 against the inlet-free top wall 14.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A low-profile ventilation system for a motor vehicle, comprising:
    an inlet duct having an inlet-free top wall, a sidewall and a bottom wall;
    a fresh air inlet in a first section of said sidewall, wherein said fresh air inlet has a minimum surface area of 161.29 $cm^2$ a recirculating air inlet in said sidewall, said recirculating air inlet including a first opening provided in a second section of said sidewall and a second opening provided in a third section of said sidewall, wherein each of said first and second openings of said sidewall are convex in profile;

a first recirculating air door for opening and closing said first opening;

a second recirculating air door for opening and closing said second opening; and a blower inlet;

wherein said first section is substantially perpendicular to said second section and said third section, and wherein said second section is laterally opposite from said third section.

2. The system of claim 1, wherein said first opening has a minimum surface area of 82 cm$^2$.

3. The system of claim 2, wherein said second opening has a minimum surface area of 82 cm$^2$.

* * * * *